(12) United States Patent
Lee

(10) Patent No.: US 10,274,961 B2
(45) Date of Patent: Apr. 30, 2019

(54) PATH PLANNING FOR AUTONOMOUS DRIVING

(71) Applicant: GM GLOBAL TECHNOLOGY OPERATIONS LLC, Detroit, MI (US)

(72) Inventor: Jin-Woo Lee, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/660,115

(22) Filed: Jul. 26, 2017

(65) Prior Publication Data

US 2019/0033871 A1 Jan. 31, 2019

(51) Int. Cl.
*G05D 1/00* (2006.01)
*G05D 1/02* (2006.01)
*G06K 9/00* (2006.01)

(52) U.S. Cl.
CPC ........ *G05D 1/0212* (2013.01); *G05D 1/0088* (2013.01); *G06K 9/00798* (2013.01); *G06K 9/00805* (2013.01)

(58) Field of Classification Search
CPC .. B60K 31/0008; B60K 31/04; G05D 1/0212; G05D 1/0088; G06K 9/00798; G06K 9/00805
USPC .............................................. 701/23, 26, 532
See application file for complete search history.

(56) References Cited

U.S. PATENT DOCUMENTS 5,648,901 A * 7/1997 Gudat ................ B60K 31/0008
701/23

* cited by examiner

*Primary Examiner* — Gertrude Arthur Jeanglaude
(74) *Attorney, Agent, or Firm* — Lorenz & Kopf LLP

(57) ABSTRACT

System and methods are provided for path finding for autonomous driving systems. The systems and methods receive a set of way points defining path segments between adjacent way points, formulate a b-spline function as a function of the path segments, and determine path data based on the formulated b-spline function. Autonomous driving systems use the output path data for controlling a vehicle.

12 Claims, 5 Drawing Sheets

PATH PLANNING FOR AUTONOMOUS DRIVING

TECHNICAL FIELD

The present disclosure generally relates to path planning and more particularly relates to systems and methods for automated or semi-automated vehicle control based on a planned path.

BACKGROUND

Some vehicles are capable of sensing their environment and localizing the vehicle based on the sensed environment. Such vehicles sense their environment using sensing devices such as radar, lidar, visual image sensors, and the like. Some vehicles further use information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane changing systems, lane following systems, traffic jam driving systems and parking assistance systems correspond to lower automation levels, while true "driverless" vehicles correspond to higher automation levels. Such vehicles may include localization capabilities.

From automated driver assistance systems to automated driverless systems, the systems use path data to define a path for the vehicle to traverse. An automated driving system uses the path data to control the vehicle to traverse a path defined by the path data. Currently envisaged systems may not always provide optimal handling for all kinds of turns, particularly turns greater than 90°, or may require significant processing and path searching.

Accordingly, it is desirable to provide systems and methods that can determine a greater range of paths in a processing efficient manner. Furthermore, other desirable features and characteristics of the present invention will become apparent from the subsequent detailed description and the appended claims, taken in conjunction with the accompanying drawings and the foregoing technical field and background.

SUMMARY

In an embodiment, a path finding engine for an autonomous driving system is provided. The path finding engine is configured to: receive a set of way points defining path segments between adjacent way points, formulate a b-spline function as a function of the path segments, determine path data based on the formulated b-spline function, and output path data for use by an autonomous driving system.

In embodiments, determining the path data includes solving the b-spline function using continuity constraints at each way point.

In embodiments, the path finding engine is operable in urban road networks as well as highway road networks and thus functions to derive path data for 90 degree turns, U-turns, and/or roundabouts, etc.

In embodiments, the path finding engine is configured to determine the continuity constraints to ensure zeroth, first and second order curve continuity at each way point.

In embodiments, a driving path defined by the path data is smooth up to second order continuity.

In embodiments, the path finding engine is configured to determine the continuity constraints resulting in a set of boundary conditions at a beginning way point of each segment and an ending way point of each segment.

In embodiments, the set of boundary conditions include positional offset boundary condition, heading angle boundary condition and curvature boundary condition.

In embodiments, the way points each include x and y coordinates.

In embodiments, the path data corresponds to a path that includes at least one turn that is 90° or greater, 180° or greater or 270° or greater.

In embodiments, the path finding engine is configured to receive at least one additional way point after the path data has been determined, and adjust the determined path data by formulating and solving an adjusted b-spline function.

In embodiments, the method includes sensing lane and/or road edges, sensing objects and determining the at least one additional way point based on the sensed objects and the sensed lane and/or road edges.

In an embodiment, a system is provided for controlling a vehicle. The system includes the path finding engine described herein, and an autonomous driving system configured to control a vehicle to traverse a path defined by the path data output by the path finding engine.

In embodiments, the system includes an obstacle detection system configured to detect at least one object along the path and to determine at least one additional way point to avoid the obstacle. The path finding engine is configured to determine and output adjusted path data using the at least one additional way point. The autonomous driving system is configured to control the vehicle to traverse an adjusted path defined by the adjusted path data.

In embodiments, the obstacle detection system is configured to detect the at least one object using at least of a camera and at least one range finding sensor, and a fusion thereof.

In embodiments, a lane detection system is included that is configured to detect at least one of lane and road boundaries based on data from at least one of a lane sensing system and a road sensing system. In embodiments, the objection detection system and the lane detection system are configured to determine the at least one additional way point to avoid the obstacle based on the detected objected and the senses lane and/or road boundaries. In embodiments, the lane sensing system and/or the road sensing system includes at least one of a camera, radar, Lidar, ultrasonic sensor and a fusion thereof.

In embodiments, a navigation system is configured to receive destination data and to determine the set of way points leading the vehicle to a destination corresponding to the destination data.

In embodiments, the system includes a map database. The navigation system is configured to determine the set of way points based on the destination data and the map database.

In an embodiment, a vehicle is provided that includes a path finding engine. The path finding engine is configured to receive a set of way points defining path segments between adjacent way points, formulate a b-spline function as a function of the path segments, and determine path data based on the formulated b-spline function. The vehicle includes an autonomous driving system configured to receive the path data and to output control commands based on the path data. The vehicle includes an actuator system configured to receive the control commands and to control the vehicle to traverse a path defined by the path data.

In embodiments, the actuator system includes at least one of: a steering control actuator, a shifter control actuator, a throttle control actuator, and a brake control actuator.

In embodiments, the vehicle includes an obstacle detection system configured to detect at least one object along the path and to determine at least one additional way point to avoid the obstacle. The path finding engine is configured to determine and output adjusted path data using the at least one additional way point. The autonomous driving system is configured to control the vehicle to traverse an adjusted path defined by the adjusted path data.

A computer implemented method of automatically controlling a vehicle. The method includes receiving a set of way points defining path segments between adjacent way points, formulating a b-spline function as a function of the path segments, determining path data based on the formulated b-spline function, and an autonomous driving system using the output path data to execute automatic vehicle control so that the vehicle traverses a path defined by the path data.

In embodiments, the method includes formulating b-spline basis functions for each segment.

In embodiments, the method includes each b-spline basis function being associated with a coefficient. The method includes determining the coefficients by setting boundary conditions that ensure zeroth, first and second order curve continuity at each way point.

In embodiments, the method includes detecting at least one object along the path, determining at least one additional way point to avoid the obstacle, determining adjusted path data using the at least one additional way point, and the autonomous driving system controlling the vehicle to traverse an adjusted path defined by the adjusted path data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The present disclosure is described primarily in the context of high level autonomous vehicles. It should be appreciated, however, that the systems and methods for estimating and using effective rolling radius as described herein can be used in a variety of degrees of autonomous vehicles, from autonomous vehicle level zero, no automation, to autonomous vehicle level five.

Figure 1:
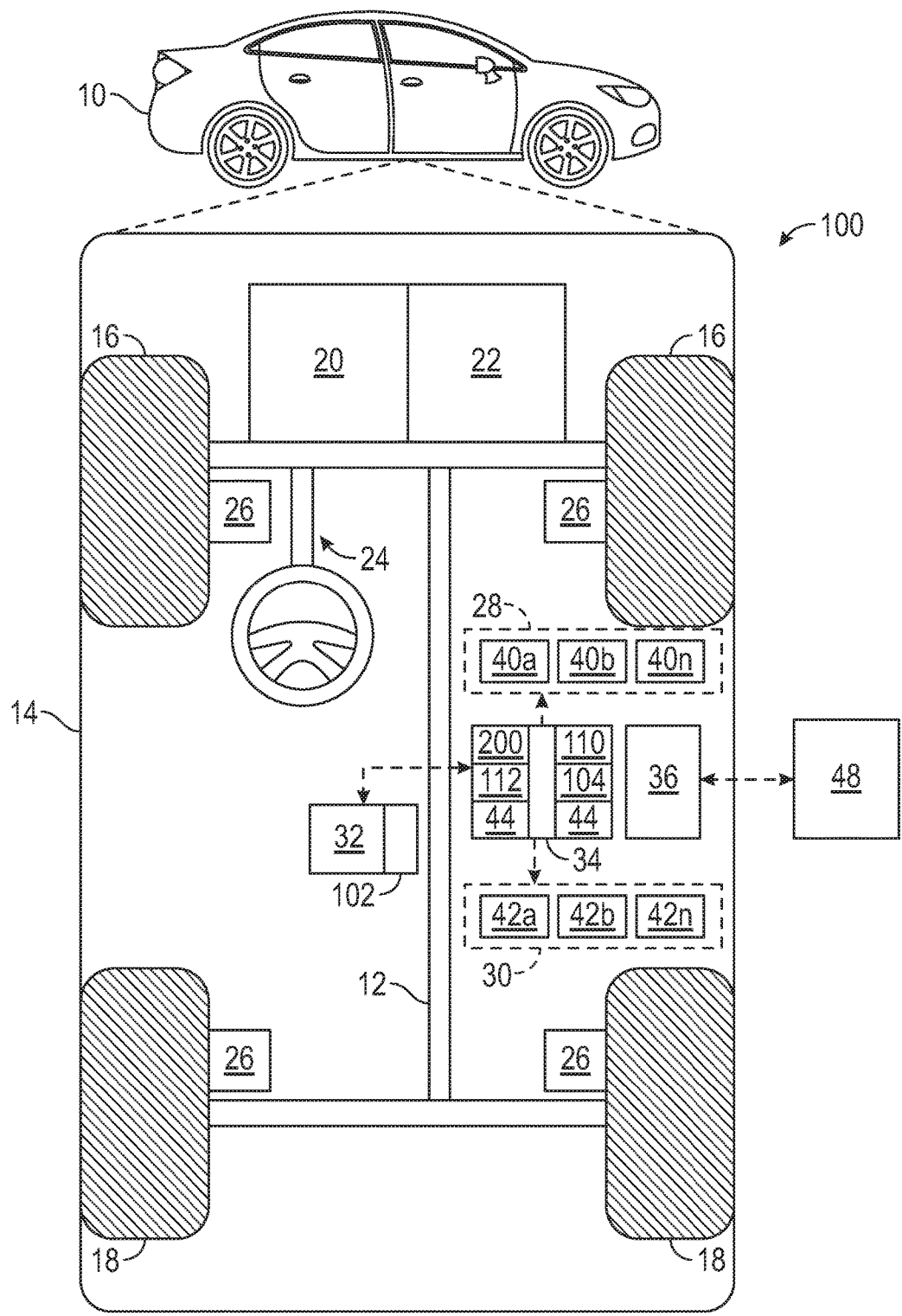
FIG. 1 is a functional block diagram illustrating a vehicle having a system that includes a path finding engine, in accordance with various embodiments.

With reference to FIG. 1, a vehicle system that includes a path finding engine 110 use in vehicle control is shown generally at 100 is associated with a vehicle 10 in accordance with various embodiments. In general, the system 100 determines a multi-segment parametric path using a b-spline function and controls the vehicle 10 to follow the determined path. The f is used as an input parameter to an automated vehicle system 200, as described later herein with respect to FIG. 2.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle in that at least some functions are executed using autonomous systems and the system 100 is incorporated into the vehicle 10. The vehicle 10 may be an autonomous vehicle classified in the range from level two to level five on the SAE International scale. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, the system 100 disclosed herein can be implemented for any level of automation (or non-automated systems) and is not limited to the present examples. Although described in terms of such a level of autonomy, the vehicle 10 is not required to be highly automated according to the teachings herein. The systems and methods for path finding described herein, in embodiments, require at least a vehicle able to receive way points from a navigation system 104 and/or an object detection system 112 and/or a lane detection system and to execute at least automated steering control function based on the determined path, irrespective of a level of automation of the vehicle. Accordingly, the description of automated vehicle control that follows should be understood as being exemplary in nature.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, wheel encoders, inertial sensors including accelerometers and yaw rate sensor, and/or other sensors. The sensor system 28 communicates with the object sensing system 112a, the lane sensing system 112b and/or the road edge sensing system 112c as described further herein. The actuator system 30 includes one or more actuator devices 42a-42n that control one or more vehicle features such as, but not limited to, the propulsion system 20, the transmission system 22, the steering system 24, and the brake system 26. The actuator system is responsive to driving commands from the automated driving system 200 as described further herein. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. In embodiments, the defined maps include a navigation map 102 used by navigation system 104. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The controller includes a number of modules (as defined herein) including the navigation system 104, the object detection system 112, the object sensing system 112a, the lane sensing system 112b, the road edge sensing system 112c, the path finding engine 110 and the automated driving system 200, in accordance with various embodiments. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling at least one component of the vehicle 10, and generate control signals to the actuator system 30 to automatically control the at least one component of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the system 100 and, when executed by the processor 44, solve a b-spline function to determine path data, and controlling the vehicle 10 to follow a path defined by the path data.

Figure 2:
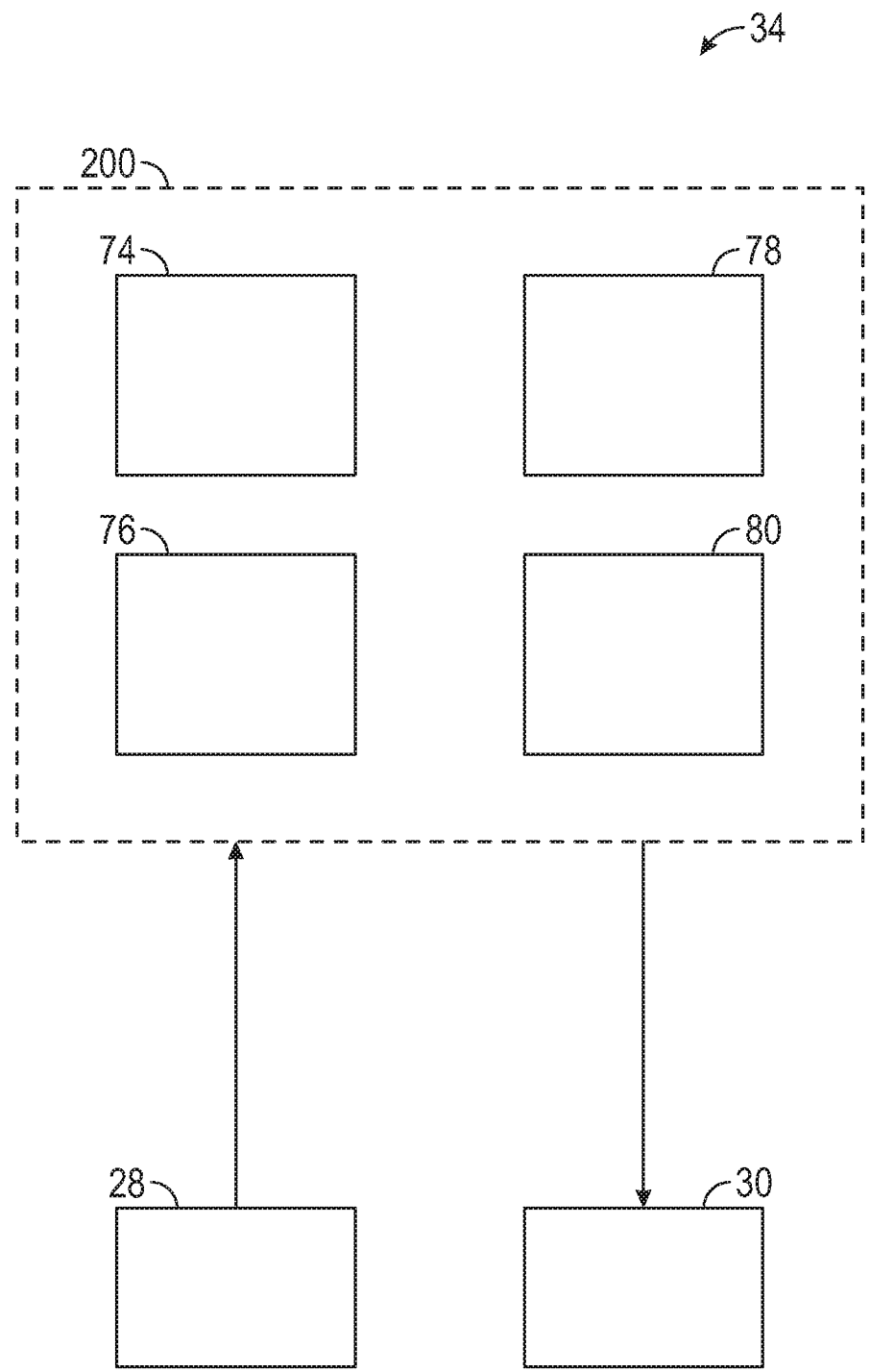
FIG. 2 is a dataflow diagram illustrating an automated driving system that includes the system including the path finding engine, in accordance with various embodiments.

In accordance with various embodiments, controller 34 implements an automated driving system (ADS) 200 as shown in FIG. 2. The automated driving system 200 is able to automate at least one function of the vehicle 10. That is, suitable software and/or hardware components of controller 34 (e.g., processor 44 and computer-readable storage device 46) are utilized to provide an automated driving system 200 that is used in conjunction with vehicle 10.

In various embodiments, the instructions of the automated driving system 200 may be organized by function or system. For example, as shown in FIG. 2, the automated driving system 200 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In embodiments, the sensor fusion system communicates with the object sensing system 112a, the lane sensing system 112b and the road edge sensing system 112c. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The path is determined through a parametric multiple segment technique as described further herein. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the automated driving system 200 is included within the system 100. There is overlap between functions of the system 100 shown in FIG. 4 (and described below) and features of the automated driving system 200 described above. For example, the systems and methods described with respect to FIGS. 3 to 5 below are included within the sensor fusion system 74, the positioning system 76, the guidance system 78, and the vehicle control system 80, as will follow from the below discussion of FIGS. 3 to 5 below. Although described herein particularly with regard to the automated driving system 200, it should be understood that the system 100 described herein can be included in other vehicle architectures.

Figure 3:
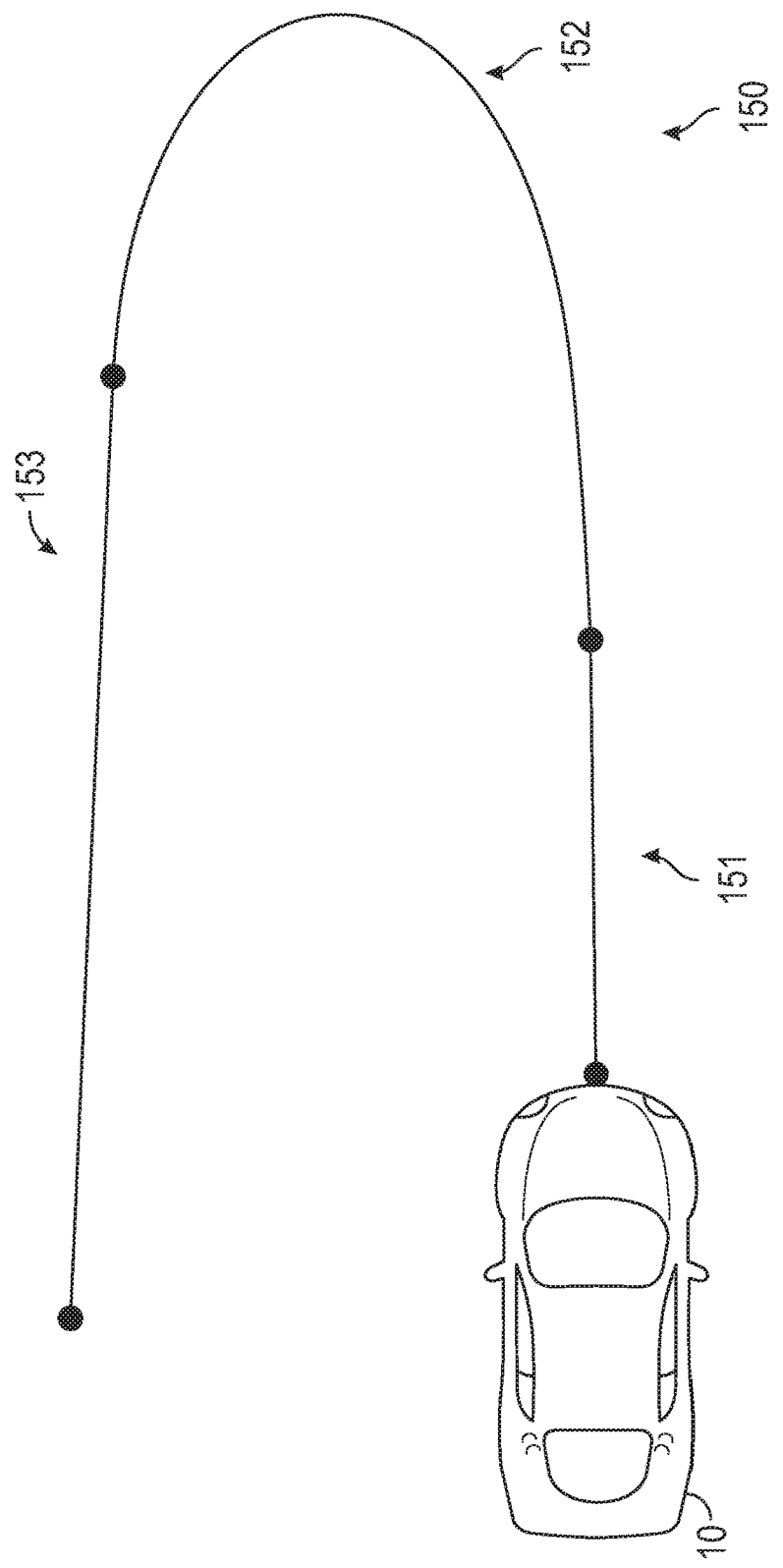
FIG. 3 is an example of a multiple segment path determined by the path finding engine described herein, in accordance with various embodiments.
Figure 4:
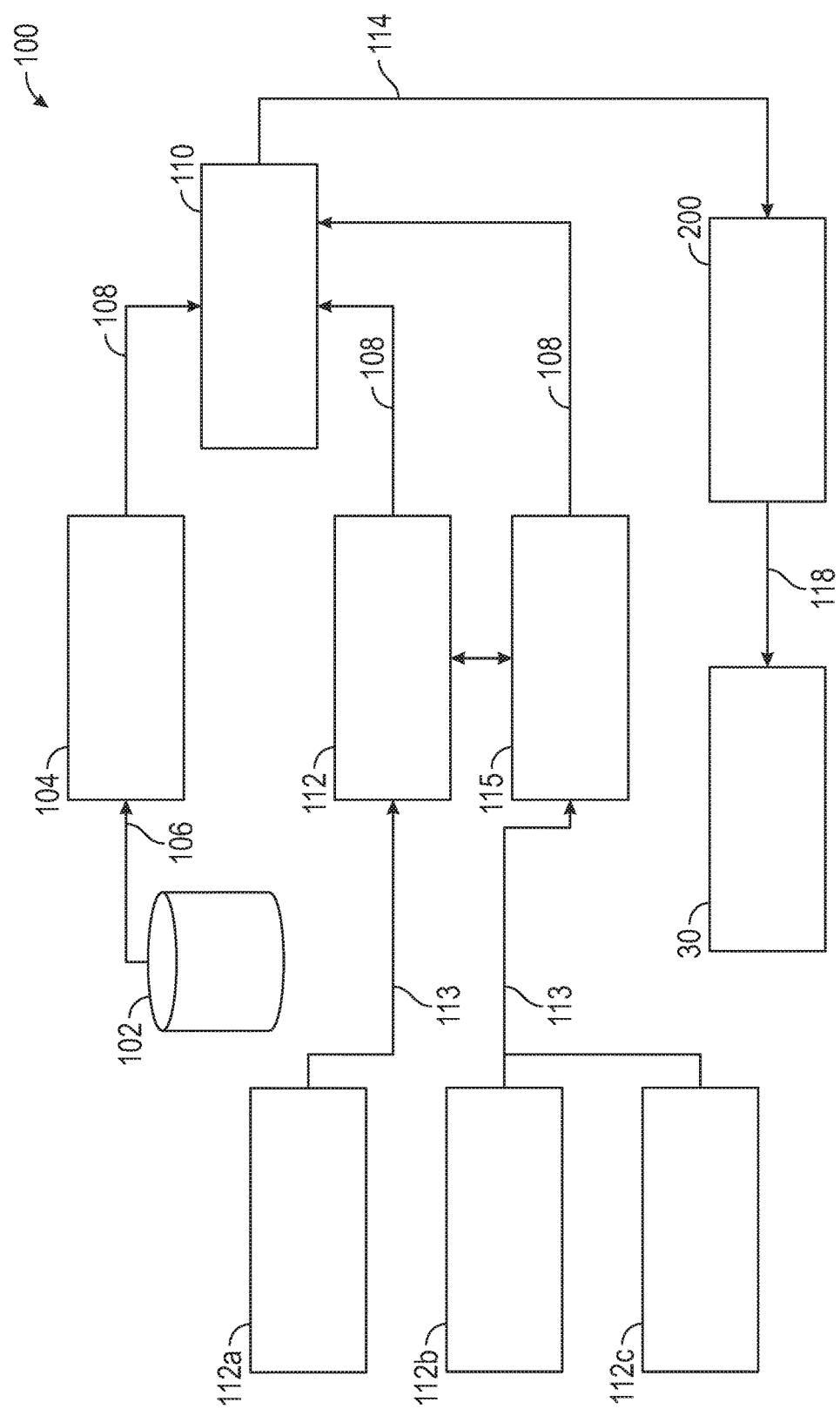
FIG. 4 is a dataflow diagram illustrating a system including a path finding engine, in accordance with various embodiments.

For example, as shown in more detail with regard to FIG. 4, the system 100 includes the navigation system 104, the object detection system 112, the object sensing system 112a, the lane sensing system 112b, the road edge sensing system 112c, the path finding engine 110, the automated driving system 200 and the actuator system 30. The path finding engine 110 makes use of b-spline theory to determine a plural segment parametric path. By using b-spline theory, a processing efficient algorithm is implemented that is adaptable to additional way points, that does not rely on intensive path searching processes and that is capable of performing sharp turns including U-turns, turns of 90° or greater, such as 180° turns around a roundabout. The implementation of b-spline theory in the present embodiment will be described further below with reference to FIG. 3.

FIG. 3 provides an example of finding a multi-segment path 150 using the path finding engine 110. The path 150 includes a first segment 151, a second segment 152 and a third segment 152. The number of segments shown is exemplary and any suitable number of segments can be determined upon in order to generate the path 150. In FIG. 3, the path 150 is in the form of a U-turn, although all manner of other paths and turns are envisaged.

The path finding engine 110 is configured to receive way points $u_3$, $u_4$, $u_5$ and $u_6$ including an origin (at the location of the vehicle 10) way point ($u_3$ in this example) and a destination way point ($u_6$ in this example). The way points define segments therebetween. The path finding engine 110 is configured to taken into account the way points and the segments therebetween to determine upon and solve a b-spline function providing path data representing a path for the vehicle 10 to follow.

The path finding engine 110 is configured to adopt b-spline theory to resolve a path planning problem into a multi-segment parametric formulation. In the exemplary embodiment, the b-spline calculation can be formulated into respective functions for each segment 151, 152, 153.

The first segment 151 can be defined using b-spline theory as follows:

$u_3 \leq u \leq u_4$ $X_{3,4}(u) = N_{0,3}(u)P_{x,0} + N_{1,3}(u)P_{x,1} + N_{2,3}(u)P_{x,2} + N_{3,3}(u)P_{u,3} + N_{4,3}(u)P_{x,4} + N_{5,3}(u)P_{x,5}$ $Y_{3,4}(u) = N_{0,3}(u)P_{y,0} + N_{1,3}(u)P_{y,1} + N_{2,3}(u)P_{y,2} + N_{3,3}(u)P_{y,3} + N_{4,3}(u)P_{y,4} + N_{5,3}(u)P_{y,5}$ (equation 1)

The second segment 152 can be defined using b-spline theory as follows:

$u_4 \leq u \leq u_5$ $X_{4,5}(u) = N_{0,3}(u)P_{x,0} + N_{1,3}(u)P_{x,1} + N_{2,3}(u)P_{x,2} + N_{3,3}(u)P_{x,3} + N_{4,3}(u)P_{x,4} + N_{5,3}(u)P_{x,5}$ $Y_{4,5}(u) = N_{0,3}(u)P_{y,0} + N_{1,3}(u)P_{y,1} + N_{2,3}(u)P_{y,2} + N_{3,3}(u)P_{y,3} + N_{4,3}(u)P_{y,4} + N_{5,3}(u)P_{y,5}$ (equation 2)

The third segment 153 can be defined using b-spline theory as follows:

$u_5 \leq u \leq u_6$ $X_{5,6}(u) = N_{0,3}(u)P_{x,0} + N_{1,3}(u)P_{x,1} + N_{2,3}(u)P_{x,2} + N_{3,3}(u)P_{x,3} + N_{4,3}(u)P_{x,4} + N_{5,3}(u)P_{x,5}$ $$Y_{5,6}(u)=N_{0,3}(u)P_{y,0}+N_{1,3}(u)P_{y,1}+N_{2,3}(u)P_{y,2}+N_{3,3}(u)P_{y,3}+N_{4,3}(u)P_{y,4}+N_{5,3}(u)P_{y,5} \quad \text{(equation 3)}$$

Assumptions are made in the following derivations for the purposes of easing mathematical calculation, namely:

$$u_6=u_7=u_8=u_9=v_x*t_{path}$$

$$u_0=u_1=u_2=u_3=0$$

where $v_x$ represents vehicle velocity in the heading direction of the vehicle 10 and $t_{path}$ represents time by which the route is to be traversed, both of which can be predetermined.

The b-spline basis functions, N_(k,p) (u) is determined from b-spline theory and are formulated by the path finding engine 110. The coefficients P_(x,k), P_(y,k) are determined by the path finding engine 110 using boundary conditions determined from a set of continuity constraints ensuring zeroth, first and second order parametric continuity. A junction between two curves is said to have zeroth order parametric continuity if the x,y values of the two curves agree. A junction between two curves is said to have first order parametric continuity if the x, y values of the two curves agree, and all their first derivatives agree at their junction. A junction between two curves is said have second order parametric continuity if the x, y values of the two curves agree, and their first and second parametric derivatives all agree at their junction.

The constraint for second order parametric continuity allows for the coefficients P_(x,k), P_(y,k) to be solved from initial and boundary conditions. The initial conditions include offset to a target path $y_0$, heading angle $\varphi_0$, initial curvature $\rho_0$, at time t=0. The boundary conditions include offset $y_f$, heading angle $\varphi_f$, initial curvature $\rho_f$ at t=$t_f$, where $t_f$ and $t_0$ are time at the start and end of a segment. The time to traverse a segment may be predetermined based on driving mode.

The initial and boundary conditions can be formulated as:

$$(x,y)|_{t=0}$$

$$y_d|_{t=0}=y_0, \left.\frac{dy_d}{dx_d}\right|_{t=0}=0, \left.\frac{d^2y_d}{dx_d^2}\right|_{t=0}=\rho_0$$

$$(x,y)|_{t=t_f}$$

$$y_d|_{t=0}=y_f, \left.\frac{dy_d}{dx_d}\right|_{t=t_f}=\varphi_f, \left.\frac{d^2y_d}{dx_d^2}\right|_{t=t_f}=\rho_f$$

In the above, x,y at t=0 represents a starting way point, x, y at t=f represents a final way point and $x_d$, $y_d$ represents a path to find.

From the six initial and boundary conditions, it is possible to formulate a set of 12 parametric conditions as shown below:

Let $$\frac{d(\ )}{du}=(\ )'.$$

It is known that $$\frac{dY}{dX}=\frac{Y'}{X'} \text{ and } \frac{d^2Y}{dX^2}=\frac{X'*Y''-X''*Y'}{X'^3}$$

Let $$X'=\sigma=\begin{cases} 1, & \text{if heading in the positive } x \text{ direction} \\ -1, & \text{otherwise} \end{cases}, \text{ then } X''=0$$

To ensure zeroth, first and second order curve continuity:

$$\left.\frac{dY}{dX}\right|_{t=0}=0, \left.\frac{d^2Y}{dX^2}\right|_{t=0}=\rho_0, \left.\frac{dY}{dX}\right|_{t=t_{path}}=\varphi_f \text{ and } \left.\frac{d^2Y}{dX^2}\right|_{t=t_{path}}=\rho_f$$

The above three initial conditions can be formulated as six parametric conditions:

$$X|_{t=0}=0 \quad Y|_{t=0}=y_0$$

$$X'|_{t=0}=1 \quad Y'|_{t=0}=0$$

$$X''|_{t=0}=0 \quad Y''|_{t=0}=\rho_0$$

The three boundary conditions can be formulated as six parametric conditions:

$$X|_{t=t_{path}}=x_f \quad Y|_{t=t_{path}}=y_f$$

$$X'|_{t=t_{path}}=\sigma \quad Y'|_{t=t_{path}}=\sigma*\varphi_f$$

$$X''|_{t=t_{path}}=0 \quad Y''|_{t=t_{path}}=\rho_f$$

Thereby formulating twelve parametric conditions.

Turning back to the example of FIG. 3, the coefficients are solved using the 12 parametric conditions as follows:

$$X_{3,4}(u_3)=0, \quad Y_{3,4}(u_3)=y_0$$

$$X'_{3,4}(u_3)=1, \quad Y'_{3,4}(u_3)=0$$

$$X''_{3,4}(u_3)=0, \quad Y''_{3,4}(u_3)=\rho_0.$$

$$X_{5,6}(u_6)=x_f, \quad Y_{5,6}(u_6)=y_f$$

$$X'_{5,6}(u_6)=\sigma, \quad Y'_{5,6}(u_6)=\sigma*\varphi_f$$

$$X''_{5,6}(u_6)=0, \quad Y''_{5,6}(u_6)=\rho_f$$

As such, a closed form solution for the parametric coefficients P_(x,k), P_(y,k) is formulated, here in matrix form:

$$P_{x,0} = 0, \; P_{x,5} = x_f$$

$$\begin{bmatrix} P_{x,1} \\ P_{x,2} \\ P_{3,x} \\ P_{x,4} \end{bmatrix} = \begin{bmatrix} \dfrac{v_x * t_{path}}{12} & 0 & & \\ \dfrac{v_x * t_{path}}{3} & \dfrac{(v_x * t_{path})^2}{32} & 0_{2\times 2} & \\ & & \dfrac{(v_x * t_{path})^2}{32} & \dfrac{-v_x * t_{path}}{3} \\ 0_{2\times 2} & & 0 & \dfrac{-v_x * t_{path}}{12} \end{bmatrix} \begin{bmatrix} 1 \\ 0 \\ -\dfrac{96}{(v_x * t_{path})^2} * x_f \\ \sigma - \dfrac{12}{v_x * t_{path}} * x_f \end{bmatrix}$$

$$P_{y,0} = y_0, \; P_{y,5} = y_f$$

$$\begin{bmatrix} P_{y,1} \\ P_{y,2} \\ P_{y,3} \\ P_{y,4} \end{bmatrix} = \begin{bmatrix} \dfrac{v_x * t_{path}}{12} & 0 & & \\ \dfrac{v_x * t_{path}}{3} & \dfrac{(v_x * t_{path})^2}{32} & 0_{2\times 2} & \\ & & \dfrac{(v_x * t_{path})^2}{32} & \dfrac{-v_x * t_{path}}{3} \\ 0_{2\times 2} & & 0 & \dfrac{-v_x * t_{path}}{12} \end{bmatrix} \begin{bmatrix} \dfrac{12}{v_x * t_{path}} * y_0 \\ \rho_0 - \dfrac{96}{(v_x * t_{path})^2} * y_0 \\ \rho_f - \dfrac{96}{(v_x * t_{path})^2} * y_f \\ \sigma * \varphi_f - \dfrac{12}{v_x * t_{path}} * y_f \end{bmatrix}$$

The skilled person will appreciate that b-spline theory allows a multitude of paths to be resolved based on input way points and segments defined therebetween. Further, by following a set of boundary conditions as described above, closed form parametric equations can be determined allowing parametric coefficients to be calculated for each b-spline basis function.

In this U-turn example, the desired path is formulated into three segments in parametric forms. Three as the number of segment is exemplary. A path may be divided into any number of segments, such as including 4 segments, 100 segments, 1000 segments, etc., depending on complexity of the path.

Referring now to FIG. 4, a data flow diagram is shown illustrating interconnections of the various modules and parts of the system 100, in accordance with exemplary embodiments.

The path finding engine 110 is configured to receive way points (x, y) 108. The path finding engine 110 is configured to formulate a b-spline function using the way points 108 and defining a multi-segment path based on the way points 108. Any number of way points 108 and segments may be defined. The b-spline function includes a plurality of b-spline basis functions multiplied by a parametric coefficient. Although six b-spline basis functions are described in the foregoing, other numbers are possible. The path finding engine 110 is configured to determine parametric curve continuity constraints to the second order as has been described above. Using the parametric curve continuity constraints and the b-spline basis function, the path finding engine 110 is configured to solve the b-spline basis function and determine values for the parametric coefficients, thereby determining a path for the vehicle 10 to follow. The path takes the form of path data 114 that is output by the path finding engine 110. The path data 114 includes x and y coordinates.

The system 100 includes the automated driving system 200 configured to receive the path data 114 and to determine driving commands 118 based thereon. In embodiments, the driving commands 118 include steering commands, throttle and breaking commands in order that the vehicle 10 is able to safely follow the path defined by the path data 114.

The system 100 includes the actuator system 30 that are responsive to the driving commands 118 to execute breaking, steering and throttle control for the vehicle 10.

The way points 108 may be received from a number of sources. In the present exemplary embodiment, three possible sources are illustrated: the navigation system 104, the object detection system 112 and the lane detection system 115. The object detection system 112 and the land detection system 115 operate, in some embodiments, in conjunction to produce way points 108 whereby lane boundaries and object boundaries are determined and way points 108 avoiding both are determined and output. The navigation system 104 is in communication with a digital navigation map 102 and is configured to receive an origin and a destination location. The navigation system 104 is configured to compute a route from the origin to the destination location based on computation preference settings such as fastest route, shortest route, etc. and map data 106 provided by the navigation map 102. The navigation system 104 determines upon way points 108 defining the route, which are output to the path finding engine to determine a suitably smooth path for the vehicle 10.

The object detection system 112 is configured to receive clear edge data 113 from the object sensing system 112a. The lane detection system 115 is configured to receive clear edge data from the lane sensing system 112b and the road edge sensing system 112c. The object detection system 112 and/or the lane detection system 115 is/are configured to determine at least one way point 108 based on the edge data 113 that avoids the obstacle and keeps within road and within a lane. The object sensing system 112a, the lane sensing system 112b and the road sensing system 112c are configured to use sensor data from the sensor system 28, such as camera, lidar, radar and/or other environmental imaging sensors, to detect an obstacle along the vehicle's path, to detect lane dimensions and to detect road edges and to determine upon clear edge data 113 defining an obstacle free path. In embodiments, the edge data 113 includes edge points inside of which the vehicle 10 should not pass. The edge points define lane edges, obstacle edges and/or road edges, in various embodiments. The object system 112a, the lane sensing system 112b and the road edge sensing system 112c are configured to operate image processing techniques such as segmentation and filtration and optionally machine learning techniques to detect and identify objects to be avoided, lanes edges and road edges. Once the object, lane edges and road edges are identified, free path dimensions can be extracted and at least one free path derived by the object detection system and/or the lane detection system. Based on the free path derivation, which generally includes a deviation from the current path to avoid an obstacle, at least one additional way point 108 is output to the path finding engine 110. The path finding engine 110 is configured to adjust the b-spline function, to determine new parametric curve continuity constraints including the additional way point 108 and to solve the b-spline function and the parametric coefficients. In this way, adjusted path data 114 is determined including an obstacle free diversion based on the one or more additional way points 108 from the obstacle avoidance system 112. The b-spline function is particularly suited to adapting a determined path to include interim way points 108 as it is a sequential function, allowing only a small part of the overall b-spline function to be re-calculated and solved.

In embodiments, the way points 108 of the navigation system 104 define a lane center. In embodiments, the way points 108 of the object detection system 112 and/or the lane detection system 115 traverse a lane to avoid an obstacle, whilst ensuring that the vehicle is located within lane and road boundaries once the object has been avoided using the clear edge data from the object sensing system 112a, the lane sensing system 112b and the road edge sensing system 112c.

Figure 5:
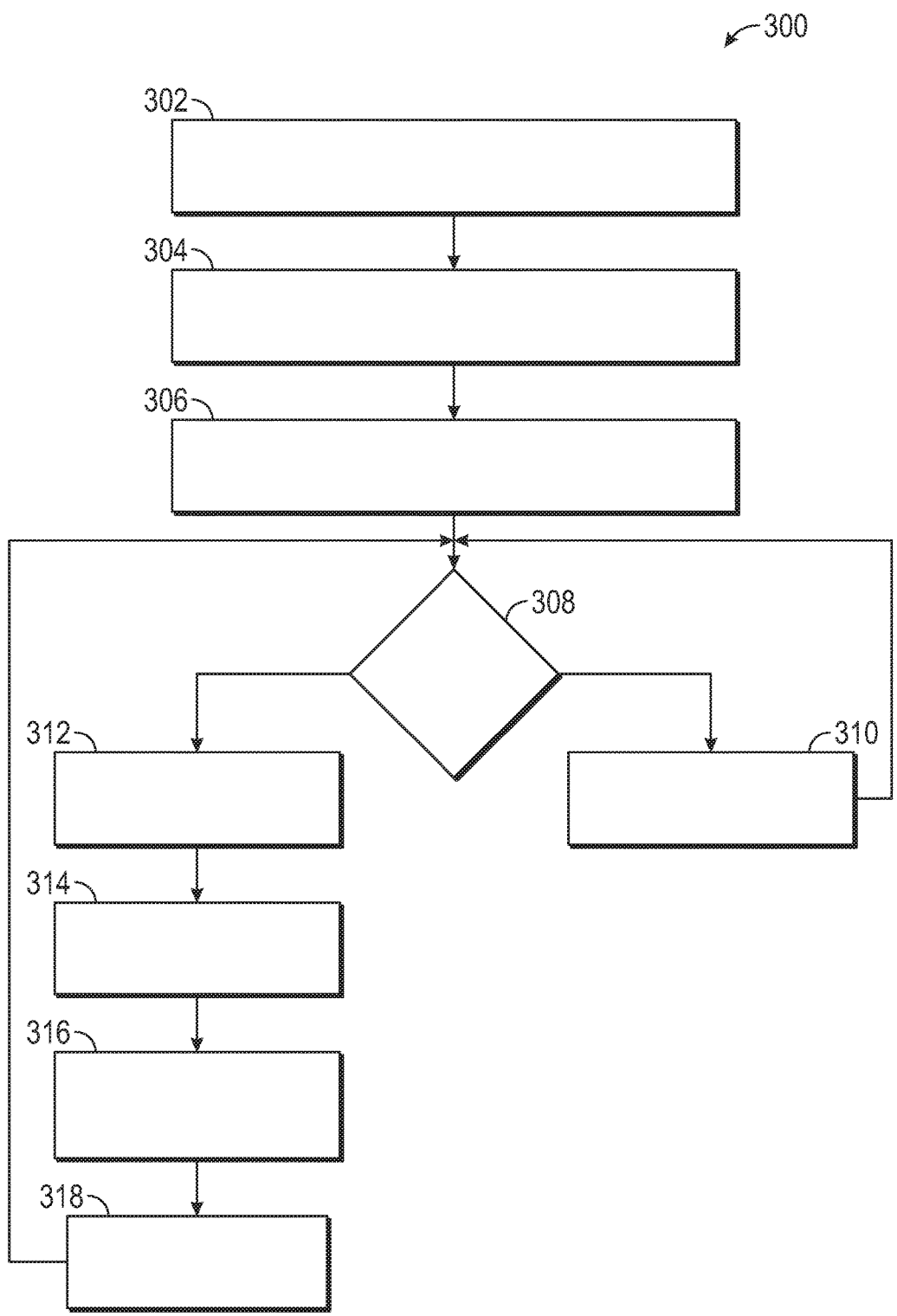
FIG. 5 is a flowchart illustrating a method for automated vehicle control, in accordance with various embodiments.

Referring now to FIG. 5, and with continued reference to FIGS. 1 to 4, a flowchart illustrates a method 300 that can be performed by the system 100 of FIGS. 1 and 4 in accordance with the present disclosure. As can be appreciated in light of the disclosure, the order of operation within the method 300 is not limited to the sequential execution as illustrated in FIG. 5, but may be performed in one or more varying orders as applicable and in accordance with the present disclosure. In various embodiments, the method 300 can be scheduled to run based on one or more predetermined events, and/or can run continuously during operation of the vehicle 10.

The method 300 includes a step 302 of the path finding engine 110 receiving way points 108. The way points 108 are received from any of a number of systems, particularly the navigation system 104. At step 304, the path finding engine 110 formulates a b-spline function as a function of the way points 108 using b-spline theory to generate b-spline basis functions and parametric coefficients associated with each b-spline basis term. In step 306, the path finding engine 110 solves the b-spline function from step 304 using boundary conditions (the initial and boundary conditions described above) that ensure second order parametric curve continuity. Accordingly, step 306 includes a pre, sub-step of determining boundary conditions based on second order parametric curve continuity constraints. By solving the b-spline function in step 306, path data 114 defining a path to be followed is determined by the method 300. Such path data 114 is used by the automated driving system 200 to determined driving commands 118, to which the actuator system 30, is responsive so that the vehicle 10 follows the path defined by the path data 114. In embodiments, the driving commands 118 include steering commands and at least one of throttle and breaking commands.

In some embodiments, an obstacle check is performed as part of the method 300. At step 308, a check is performed as to whether an obstacle is present along the path defined by the path data 114. The obstacle check is generally performed through the object detection system 112. If no obstacle is in the path, the method 300 proceeds to step 310 of outputting the path data 114 determined in step 306 (and the subsequent steps of controlling the vehicle 10 to follow the path). The method 300 loops back to the obstacle checking step 308 so that an obstacle check is iteratively performed throughout driving the vehicle 10 along the path.

If an obstacle is determined to be in the path of the vehicle 10 at step 308, one or more interim way points 108 are added in step 312 to divert the path to avoid the obstacle. The interim way points 108 are generally determined through the object detection system 112 and/or the lane detection system 115 based on edge data 113 received from at least one of object sensing system 112a, lane sensing system 112b and road edge sensing system 112c. The interim way points 108 are communicated to the path finding engine 110. In step 314, the path finding engine 110 adjusts the b-spline function determined in step 304 so as to include a dependence on the interim way points 308. The adjustment is localized around the interim way points 108 as an inherent facet of the b-spline function, thereby reducing processing requirements for additional way points. In embodiments, adjusting the b-spline function includes adding one or more new waypoints 108 and creating at least one new segment(s). For example, assuming three segments for a U-turn scenario, if an obstacle interferes in the defined path, one or more interim way points 108 are added, thereby adding at least one new segment(s) according to the one or more new way points 108.

In step 306, the adjusted b-spline function is solved using new boundary conditions determined from second order curve continuity constraints at the junctions of segments added as a result of the interim way points 108. Solving the adjusted b-spline function in step 316 results in adjusted path data 114 defining a path including a diversion as compared to the path defined by the original path data 114 provided by step 306. As has been described heretofore, the path finding engine 110 includes processor and computer program instructions configured to determine upon the parametric curvature constraints and solve the adjusted b-spline function. The diversion avoids the obstacle, thereby defining an obstacle free path. In step 318, the adjusted path data is output by the path finding engine 110 for use by the automated driving system 200 and the actuator system 30 to control the vehicle to follow the adjusted path. After step 318, the method 300 loops back to the obstacle check step 308 to continue scanning for obstacles and adjusting the path of the vehicle to avoid such obstacles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method for finding a path for an autonomous driving system, comprising:
- receiving, by a processor, a set of way points defining path segments between adjacent way points;
- formulating, by a processor, a baseline b-spline function of b-spline basis terms, the baseline b-spline function formulated as a function of the path segments, the baseline b-spline function having parametric coefficients associated with each of the b-spline basis terms;
- determining, by a processor, initial conditions to include an offset to a target path $y_0$, a heading angle $\varphi_0$, and initial curvature $\rho_0$ at a time t equal to zero;
- determining, by a processor, boundary conditions to include an offset $y_f$, a heading angle $\varphi_f$, an initial curvature $\rho_f$ at $t=t_f$, where $t_f$ and $t_0$ are times at the start and end of a segment;
- solving, by a processor, the baseline b-spline function based on the initial conditions and the boundary conditions at each way point to provide second order parametric curve continuity;
- determining, by a processor, path data based on results of the solved baseline b-spline function; and
- controlling, by a processor, a path of the vehicle based on the path data.

2. The method of claim 1, wherein the way points each include x and y coordinates.

3. The method of claim 1, wherein the path data corresponds to a path that includes at least one turn that is 90° or smaller or greater.

4. The method of claim 1, configured to receive at least one additional way point after the path data has been determined, and adjust the determined path data by formulating and solving an adjusted b-spline function.

5. A computer implemented system for controlling a vehicle, comprising:
- a path finding engine configured to, by a processor:
  - receive a set of way points defining path segments between adjacent way points;
  - formulate a baseline b-spline function of b-spline basis terms, the baseline b-spline function formulated as a function of the path segments, the baseline b-spline function having parametric coefficients associated with each of the b-spline basis terms;
  - determine initial conditions to include an offset to a target path $y_0$, a heading angle $\varphi_0$, and initial curvature $\rho_0$ at a time t equal to zero;
  - determine boundary conditions to include an offset $y_f$, a heading angle $\varphi_f$, an initial curvature $\rho_r$ at $t=t_f$, where $t_f$ and $t_0$ are times at the start and end of a segment;
  - solve the baseline b-spline function based on the initial conditions and the boundary conditions at each way point to provide second order parametric curve continuity;
  - determine path data based on results of the solved baseline b-spline function; and
  - output path data; and
- an autonomous driving system configured to, by a processor, control a vehicle to traverse a path defined by the path data output by the path finding engine.

6. The system of claim 5, comprising an object detection system configured to detect at least one object along the path and to determine at least one additional way point to avoid the obstacle, wherein the path finding engine is configured to determine and output adjusted path data using the at least one additional way point, and wherein the autonomous driving system is configured to control the vehicle to traverse an adjusted path defined by the adjusted path data.

7. The system of claim 6, wherein the object detection system is configured to detect the at least one object using data from an object sensing system comprising at least one of a camera, radar, Lidar, ultrasonic sensor, any type of range finding sensor, any type of object detection sensor, and a fusion thereof.

8. The system of claim 6, comprising a lane detection system configured to detect at least one of lane and road boundaries based on data from at least one of a lane sensing system and a road sensing system comprising at least one of a camera, radar, Lidar, ultrasonic sensor and a fusion thereof, wherein the objection detection system and the lane detection system are configured to determine the at least one additional way point to avoid the obstacle.

9. The system of claim 5, comprising a navigation system configured to receive destination data, roadway networks, and to determine the set of way points leading the vehicle to a destination corresponding to the destination data.

10. A vehicle, comprising:
- a path finding engine configured to, by a processor:
  - receive a set of way points defining path segments between adjacent way points;
  - formulate a baseline b-spline function of b-spline basis terms, the baseline b-spline function formulated as a function of the path segments, the baseline b-spline function having parametric coefficients associated with each of the b-spline basis terms;
  - determine initial conditions to include an offset to a target path $y_0$, a heading angle $\varphi_0$, and initial curvature $\rho_0$ at a time t equal to zero;
  - determine boundary conditions to include an offset $y_f$, a heading angle $\varphi_f$, an initial curvature $\rho_f$ at $t=t_f$, where $t_f$ and $t_0$ are times at the start and end of a segment;
  - solve the baseline b-spline function based on the initial conditions and the boundary conditions at each way point to provide second order parametric curve continuity;
  - determine path data based on results of the solved baseline b-spline function;
- an autonomous driving system configured to, by a processor, receive the path data and to output control commands based on the path data; and
- an actuator system configured to, by a processor, receive the control commands and to control the vehicle to traverse a path defined by the path data.

11. The vehicle of claim 10, wherein the actuator system includes at least one of: a steering control actuator, a shifter control actuator, a throttle control actuator, and a brake control actuator.

12. The vehicle of claim 10, comprising an obstacle detection system configured to detect at least one object along the path and to determine at least one additional way point to avoid the obstacle, wherein the path finding engine is configured to determine and output adjusted path data using the at least one additional way point, and wherein the autonomous driving system is configured to control the vehicle to traverse an adjusted path defined by the adjusted path data.

* * * * *